US009319426B2

(12) United States Patent
Webb et al.

(10) Patent No.: US 9,319,426 B2
(45) Date of Patent: Apr. 19, 2016

(54) SYSTEM AND METHOD FOR OPERATING MALICIOUS MARKER DETECTION SOFTWARE ON MANAGEMENT CONTROLLER OF PROTECTED SYSTEM

(71) Applicant: Dell Products, LP, Round Rock, TX (US)

(72) Inventors: Theodore S. Webb, Austin, TX (US); Jacqueline H. Wilson, Austin, TX (US); Jon R. Ramsey, Atlanta, GA (US); Mukund P. Khatri, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 332 days.

(21) Appl. No.: 13/920,746

(22) Filed: Jun. 18, 2013

(65) Prior Publication Data
US 2014/0373151 A1    Dec. 18, 2014

(51) Int. Cl.
*H04L 29/06* (2006.01)
(52) U.S. Cl.
CPC ........... *H04L 63/145* (2013.01); *H04L 63/1425* (2013.01)

(58) Field of Classification Search
USPC .......................................................... 726/24
See application file for complete search history.

(56) References Cited

U.S. PATENT DOCUMENTS

| 8,458,791 | B2 | 6/2013 | Do et al. |
| 2006/0005244 | A1* | 1/2006 | Garbow et al. ................. 726/24 |
| 2010/0057982 | A1 | 3/2010 | Barde |
| 2012/0047576 | A1 | 2/2012 | Do et al. |
| 2014/0289852 | A1* | 9/2014 | Evans et al. ..................... 726/23 |

* cited by examiner

*Primary Examiner* — Tu Nguyen
(74) *Attorney, Agent, or Firm* — Larson Newman, LLP

(57) ABSTRACT

An information handling system includes a processor and a management controller separate from the processor. The management controller is operable to store an anti-virus program and a malicious marker detection program in a memory of the management controller, and to execute the malicious marker detection program. The malicious marker detection program operates to detect a state of a device of the information handling system, determine that the information handling system is under attack from a malicious program in response to detecting the state of the device, and send an alert to a management system coupled to the information handling system, the alert indicating that the information handling system is under attack from the malicious program.

20 Claims, 4 Drawing Sheets

SYSTEM AND METHOD FOR OPERATING MALICIOUS MARKER DETECTION SOFTWARE ON MANAGEMENT CONTROLLER OF PROTECTED SYSTEM

FIELD OF THE DISCLOSURE

This disclosure relates generally information handling systems, and more particularly relates to operating malicious marker detection software on a management controller of a protected system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can be the target of malicious software, such as viruses, malware, spam, and the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.
DETAILED DESCRIPTION OF DRAWINGS The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
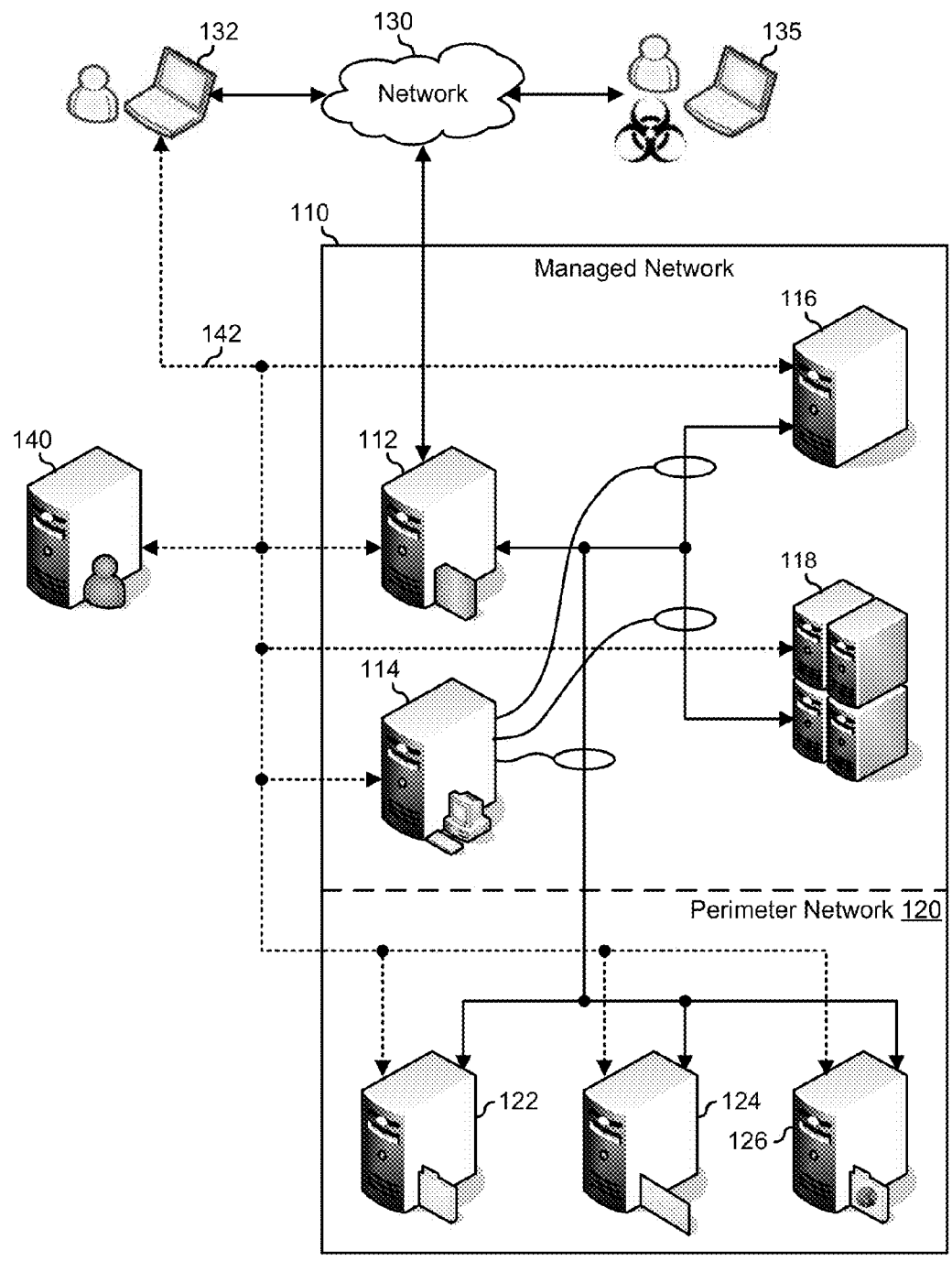
FIG. 1 is a block diagram illustrating a malicious marker detection system according to an embodiment of the present disclosure.

FIG. 1 illustrates a malicious marker detection system 100 that can be implemented on one or more information handling systems. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Malicious marker detection system 100 includes a managed network 110, a data network 130, and a management system 140. Managed network 110 represents a network of resources that provide one or more services or functions to one or more network client systems 132 that obtain the services and functions of the managed network via data network 130. In a particular embodiment, data network 130 represents a public network such as the Internet, and the services and functions of managed network 110 represent publicly accessible services and functions, such as free services and functions or subscriber based services or functions. In another embodiment, data network 130 represents a private network such as a local intranet, a corporate network, or another private network, and the services and functions of managed network 110 represent services and features that are accessible to users of the private network.

Managed network 110 includes a firewall 112, an intrusion prevention and detection system (IPDS) 114, a server 116, a network storage device 118, and a perimeter network 120. Perimeter network 120 includes a file server 122, a mail server 124, and a web server 126. Perimeter network 120 operates as a sub-network that exposes external-facing services and functions of managed network 120 to a larger untrusted network. For example, managed network 110 can include services and functions of server 116 and network storage device 118 that are provided only to corporate users, and can include services and functions of file server 122, mail server 124, and web server 126 to users of the Internet. Firewall 112 operates to control the incoming and outgoing traffic on data network 130 by analyzing the data packets and determining whether the traffic should be allowed to pass through the firewall based on predetermined rules. For example, firewall 112 can operate to prevent spam e-mail from reaching e-mail server 124, and can prevent the elements of managed network 110 from accessing malicious web sites. IPDS 114 operates to monitor traffic on managed network 110 malicious activity, log information about any malicious activity, and attempt to stop the malicious activity. For example, IPDS 114 can take actions such as sending an alarm, dropping malicious packets, resetting connections, or blocking traffic from the offending Internet protocol (IP) addresses.

Management system 140 represents one or more network management resources for monitoring and directing the operations on managed network 110. In a particular embodiment, management system 140 operates as a part of, and is co-located with the elements of managed network 110. In another embodiment, management system 140 operates separately from, and is located remotely from the elements of managed network 110. Management system 140 is connected to firewall 112, IPDS 114, server 116, network storage device 118, file server 122, mail server 124, web server 126 and network client system 132 via a management network 142. In a particular embodiment, management network 142 represents a separate and dedicated network between management station 140 and the elements of managed network 110 and network client system 132. In another embodiment, management network 142 represents an overlay network whereby management system 140 is connected to the elements of managed network 110 and to network client system 132 via a common network infrastructure as data network 130. In yet another embodiment, management network 142 represents a network were one or more of the elements of managed network 110 and one or more network client system 132 are connected to management system 140 by a separate network, and other elements of the managed network and other network client systems are connected to the management system by an overlay network.

Data network 130 can provide a conduit for a malicious client system 135 to attempt to infect managed network 110 and network client systems 132 with computer viruses, malware, spam, or other malicious software. Malicious client system 135 also attempts to hack managed network 110 and network client systems 132 to obtain access to resources and information that is available to the managed network and the network client systems. For example, malicious client system 135 can infect network client system 132 with a Trojan that unlocks one or more capability of the network client system, thereby permitting the malicious client system to execute commands on the network client system. Once malicious client system 135 gains access to execute commands on network client system 132, further exploration of the network client system can provide details as to network structure, available network commands, and the utilities available to the network client system, and permit the malicious client system to retrieve local account information and cached credentials on the network client system. Malicious client system 135 can also attempt to inject a hash to elevate a user account associated with network client system 132 to a domain administrator account to gain access to other network client systems and the resources of managed network 110. If successful, malicious client system 135 can determine the presence of a domain controller on managed network 110 and can connect to the domain controller as a domain administrator via the network client system and capture domain account information and retrieve cached credentials on the domain controller. Note that malicious client system 135 can represent a system that is attacking managed network 110 and network client systems 132 from outside of malicious marker detection system 100, but this is not necessarily so. For example, once a first network client system 132 is infected with a virus, an operator can use that first network client system to infect other network client systems.

With the domain account information and credentials, malicious client system 135 can log on to one or more network client system 132 and onto the elements of managed network 110 with impunity. With the ability to log on to the elements of managed network 110, malicious client system 135 can harvest large amounts of confidential and critical data, manipulate settings of the elements of managed network 110 to permit further exploitation of malicious marker detection system 100, or otherwise cause harm to the operator of the malicious marker detection system. For example, malicious client system 135 can obtain administrative access to firewall 112 and change the protection settings to permit data traffic from known malicious web sites.

Malicious marker detection system 100 operates to mitigate the threat associated with malicious client system 135 in two of complimentary ways. Malicious marker detection system 100 includes global level protections and local level protections. On the global level, firewall 112 controls data traffic by analyzing the data traffic to determine if a particular data packet should be permitted to enter or exit the network based upon a set of rules associated with the sources and destinations of the network data traffic. In this way, known sources of malicious content can be denied access to managed network 110 and network client systems 132, and access requests from the managed network and the network client systems to such sources of malicious content can be dropped. In another global level protection measure, IPDS 114 monitors activities on managed network 100 to look for signatures that indicate that data flowing in the managed network and network client systems 132 includes malicious activities or indicates policy violations on the network.

At the local level, each element of managed network 110 and network client systems 132 includes anti-virus, anti-malware, and anti-spam software (referred to hereinafter collectively as anti-virus software) that attempts to block malicious client system 135 from gaining an initial foothold in the protected system. Such anti-virus software includes software for searching the contents of files stored in the memory of the protected system to detect various signatures associated with known malicious software. In this way, known malicious software can be identified and blocked from being executed on the infected system, and the malicious software can be removed.

In another local level protection measure, each element of managed network 110 and network client systems 132 includes malicious marker detection (MMD) software that looks at the activity and the processes running on the protected system to detect the effects of malicious software. Here, the MMD software is distinguished from anti-virus software in that the anti-virus software is engaged primarily in searching the contents of files, either as stored on a storage system of the protected system, or as received by the protected system, while the MMD software is engaged in monitoring various states of the protected system to identify patterns indicative of malicious activity on the protected system. For example, the MMD software can detect markers indicative of malicious activity by monitoring operating system kernel objects, file system traffic, memory objects and usage information, registry keys and changes to the registry, running processes and the starting and stopping of processes, network permissions and usage, logged users, scheduled tasks, and the like. In a particular embodiment, the MMD software operates to create a log of malicious activity when such activity is detected, and to send an alert to management system 140 indicating that the malicious activity has been detected. In another embodiment, the MMD software operates to thwart the attack posed by the malicious activity. For example, the MMD software can restore a default registry key, halt a malicious process, or the like.

In a particular embodiment, management system 140 operates to provide the anti-virus and MMD software to the elements of managed network 110 and network client systems 132, and the elements of the managed network and the network client systems execute the anti-virus and MMD software as run-time processes under an operating system running on the systems. In another embodiment, management system 140 operates to provide the anti-virus and MMD software to a management controller (MC) implemented on the elements of managed network 110 and network client systems 132, and the MCs operate to execute the anti-virus and MMD software as out-of-band processes on the systems, as described below. In a particular embodiment, the anti-virus and MMD software is provided to the elements of managed network 110 and to network client systems 132 as executable scripts that are executable either as run-time processes or as out-of-band processes. In a particular embodiment, the anti-virus and MMD software is routinely updated to keep pace with an ever growing and more sophisticated threat environment posed by malicious client system 135. In particular, updates to the anti-virus and MMD software can be developed by a combination or automated development and expert design.

Figure 2:
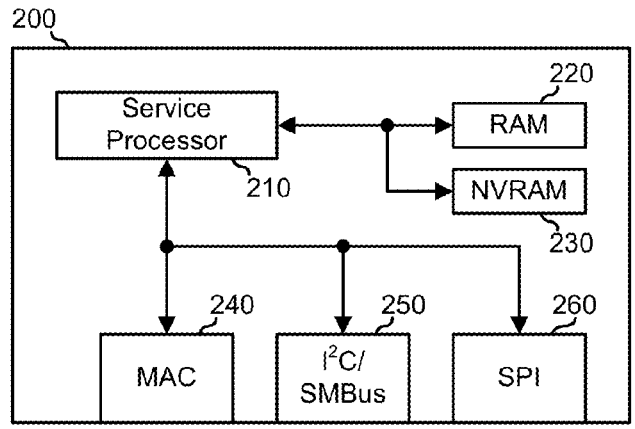
FIG. 2 is a functional block diagram illustrating an embodiment of a management controller in an information handling system.

FIG. 2 illustrates an embodiment of a management controller (MC) 200 which can be instantiated on one or more of the elements of managed network 110 and network client systems 132. MC 200 can be coupled to devices within the systems, such as processors, a chipset, memory devices, a BIOS/EFI module, a graphics interface, a video display, an I/O interface, a disk controller, a network interface, or another device of the system, as needed or desired. MC 200 includes a system communication bus that provides an interface between the MC and devices that are external to the system. For example, MC 200 can be connected via the system communication bus to a management system similar to management system 140 for out-of-band management of the system. In a particular embodiment, MC 200 operates on a separate power plane of the system from other devices of the system, such that the MC can be operated while the other devices are powered off. In another embodiment, MC 200 operates in a pre-operating-system operating state (during boot of the system). Commands, communications, or other signals may be sent to or received from MC 200 by the management system. In a particular embodiment, MC 200 is included on a main circuit board (e.g., a baseboard, a motherboard, or any combination thereof), integrated onto another component such as the chipset, or another suitable location, as needed or desired. As such, MC 200 can be part of an integrated circuit or a chip set within the system. For example, MC 200 can include a baseboard management controller (BMC), an integrated Dell remote access controller (iDRAC), another controller, or any combination thereof.

MC 200 includes a service processor 210, a random-access memory (RAM) 220, a non-volatile RAM (NVRAM) 230, a media access control interface (MAC) 240, an I²C/SMBus interface 250, and an serial peripheral interface (SPI) 260. MC 200 operates as a separate microcontroller in an information handling system, providing a dedicated management channel for maintenance and control of resources in the information handling system. In a particular embodiment, the resources in the information handling system are connected to I²C/SMBus interface 250, and SPI interface 260, permitting MC 200 to receive information from or send information to the resources. MC 200 is also connected to an external network through MAC 240, permitting MC 200 to receive information from or send information to an external management system similar to management system 140. In a particular embodiment, MAC 240 includes an Ethernet standard interface, such as a reduced media independent interface (RMII), a network communication service interface (NC-SI), another network standard interface, or a combination thereof.

MC 200 is implemented as one or more integrated circuit devices incorporated into a main circuit board or a separate circuit board of the information handling system. In a particular embodiment, MC 200 operates on a separate power plane from other resources in the information handling system, enabling the MC to communicate with the management system while other resources of the information handling system are powered off. In this way, information can be sent from the management system to MC 200 and the information is stored in RAM 220 or NVRAM 230. In a particular embodiment, information stored in RAM 220 is lost when MC 200 is powered-down, while information stored in NVRAM 230 is saved through a power-down/power-up cycle.

In a particular embodiment, a system includes a management controller that is coupled to a management system. The management station sends anti-virus and MMD software to the management controller. The management controller stores the anti-virus and MMD software while the system is powered off, and the management controller executes the anti-virus and MMD software to protect the system. In a particular embodiment, the connection between the management controller and the management station is a secure connection, and is not accessible to a malicious client system such as malicious client system 135. As such, the anti-virus and MMD software are less vulnerable to attack from the malicious client system than if the software were running out of the OS kernel.

Figure 3:
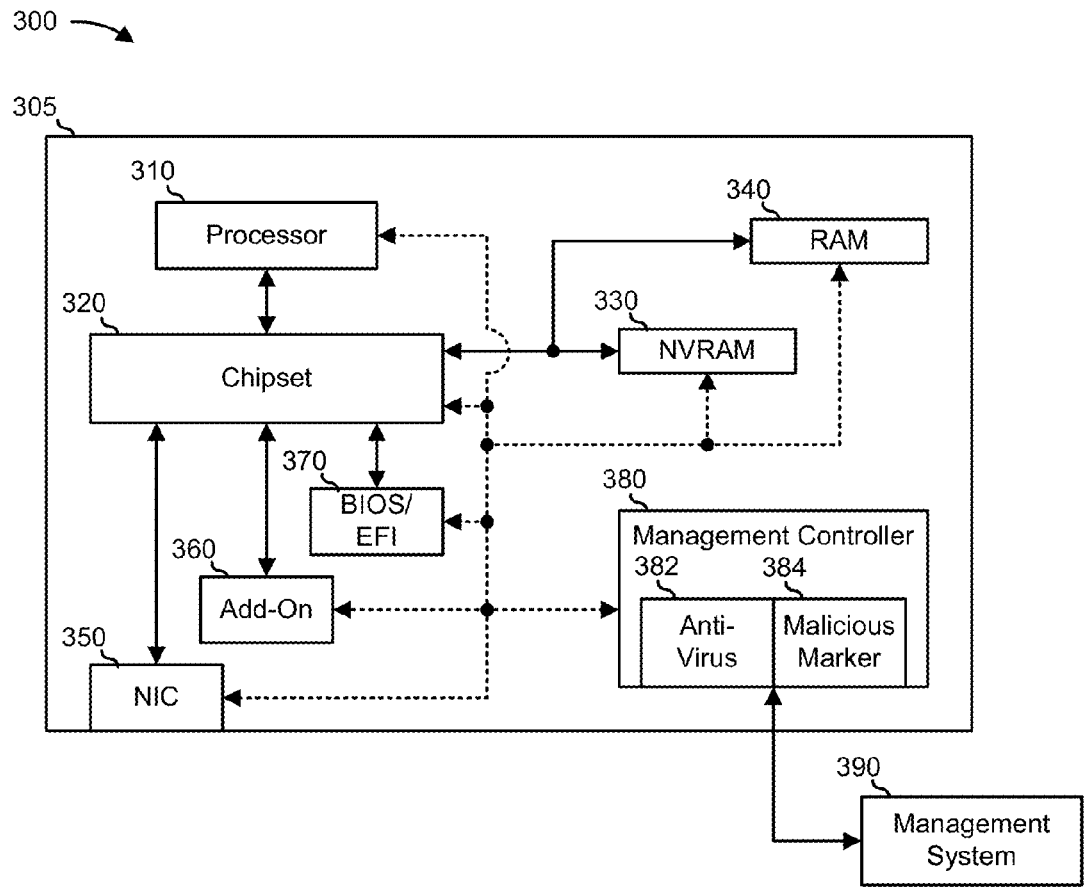
FIG. 3 is a functional block diagram illustrating an embodiment of a managed system of the present disclosure.

FIG. 3 shows a managed network 300 that includes a protected system 305 and a management station 390. Protected system 305 includes a processor 310, a chipset 320, a system NVRAM 330, a system RAM 340, a NIC 350, an add-on resource 360, a BIOS/EFI module 370, and a MC 380, similar to MC 200. MC 380 is coupled to processor 310, chipset 320, NVRAM 330, RAM 340, NIC 350, add-on resource 360, BIOS/EFI module 370, and management station 390. MC 380 includes anti-virus software 382 and MMD software 384 stored in a memory of the management controller. Here, because antivirus software 382 and MMD software 384 are stored in management controller 380, the software is less subject to being tampered with than would be the case if the software was stored on protected system 305 and was executed as a run-time process of the OS kernel operating on the protected system.

Anti-virus software 382 and MMD software 384 operate to provide local level protection to protected system 305 against attacks from malicious software. Anti-virus software 382 includes anti-virus, anti-malware, and anti-spam to block a malicious client system from gaining an initial foothold in protected system 305. As such, anti-virus software 382 includes software for searching the contents of files stored in NVRAM 330, in RAM 340, in storage systems such as network attached storage or internal hard drives of protected system 305, or the like, to detect signatures associated with known malicious software. MMD software 384 operates to look at the activity and the processes running on protected system 305 to detect the effects of malicious software. As such, MMD software 384 is engaged in monitoring various states of protected system 305 to identify patterns indicative of malicious activity on the protected system. In a particular embodiment, MC 380 operates MMD software 384 to receive status information from processor 310, chipset 320, NVRAM 330, RAM 340, NIC 350, add-on resource 360 and BIOS/EFI module 370, and to monitor operating system kernel objects, file system traffic, memory objects and usage information, registry keys and changes to the registry, running processes and the starting and stopping of processes, network permissions and usage, logged users, scheduled tasks, and the like. Here, the information received from the devices of protected system 305 can include information from control and status registers of the devices. In another embodiment, MC 380 operates MMD software 384 to examine the data being transferred or stored on protected system 305. For example, MMD software 384 can examine data stored in RAM 340 to examine a registry associated with the operating system of protected system 305, to detect malicious activity within the registry. Here, where MC 380 may lack an ability to directly read data, for example in NVRAM 330 or in RAM 340, MMD software 384 can include sub-routines that operate to run in the run-time environment of the operating system to provide the visibility into the data that is needed to perform the detection of the malicious activity in protected system 305. In a particular embodiment, MMD software 384 operates to create a log of malicious activity when such activity is detected, and to send an alert to management system 390 indicating that the malicious activity has been detected. In another embodiment, MMD software 384 operates to thwart the attack posed by the malicious activity. For example, MMD software 384 can restore a default registry key, halt a malicious process, or the like. Management system 390 operates to provide anti-virus software 382 and MMD software 384 to MC 380.

Figure 4:
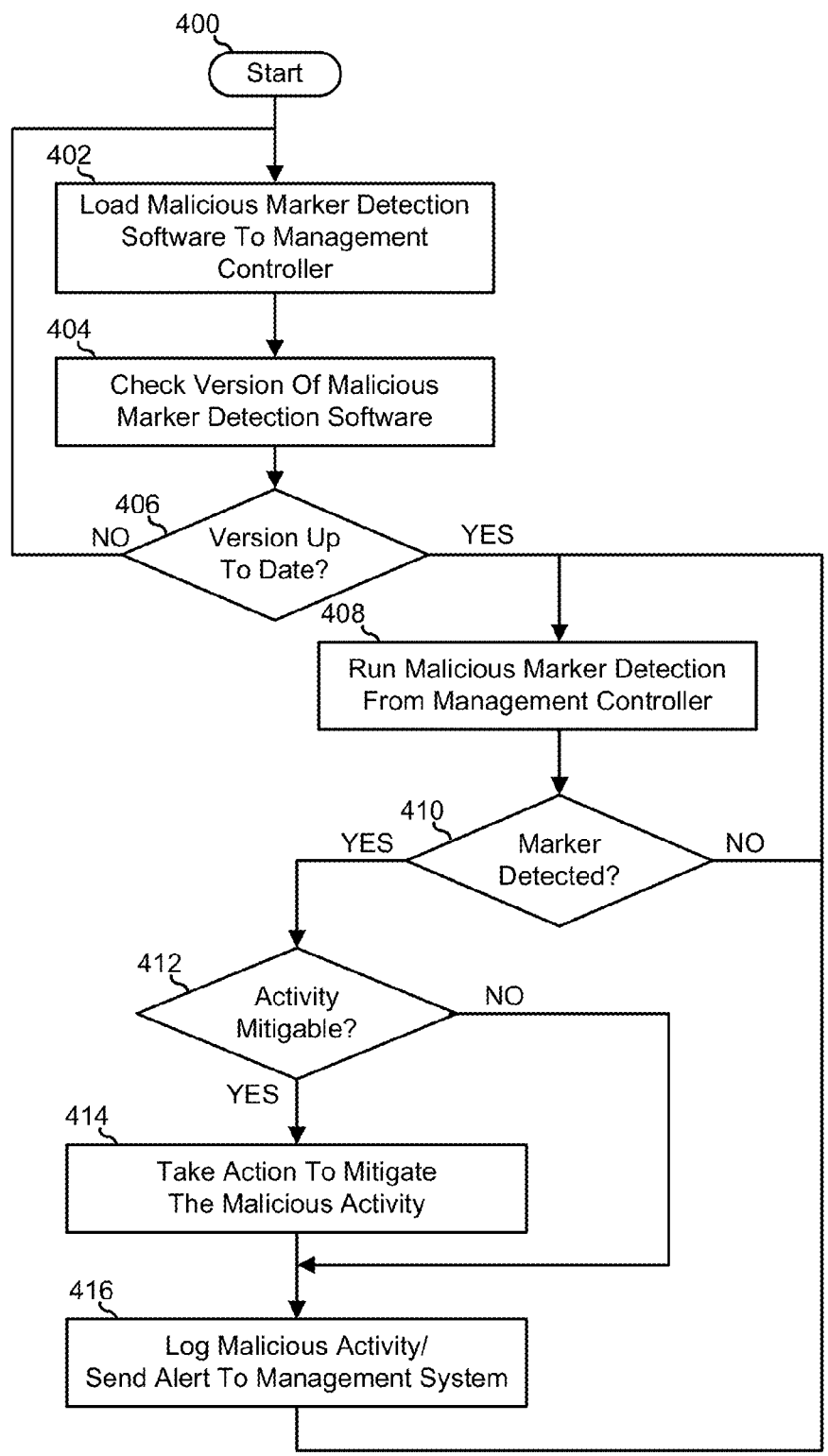
FIG. 4 is a flowchart illustrating a method of operating malicious marker detection software on a management controller of a protected system.

FIG. 4 illustrates a method of operating malicious marker detection software on a management controller of a protected system starting in block 400. Malicious marker detection software is loaded to a management controller of a protected system in block 402. For example, management system 390 can load MMD software 384 to management controller 380. A version of the malicious marker detection software is checked to determine if the software is up to date in block 404. For example, MMD software 382 can include an indication to date the software, such as a revision level, a date code, or the like. In a particular embodiment, the malicious marker detection software can include a hash to ensure that the software has not been tampered with prior to being loaded to the protected system. A decision is made as to whether or not the version of the malicious marker detection software is up to date in decision block 406. If not, the "NO" branch of decision block 406 is taken and the method returns to block 402, where the malicious marker detection software is loaded to the management controller.

If the version of the malicious marker detection software is up to date, the "YES" branch of decision block 406 is taken and the malicious marker detection software is executed out of the management controller in block 408. A decision is made as to whether or not a malicious marker is detected in decision block 410. If not, the "NO" branch of decision block 410 is taken and the method returns to block 408 where the software continues execution out of the management controller. If a malicious marker is detected, the "YES" branch of decision block 410 is taken and a decision is made as to whether or not the detected malicious activity is mitigable by the malicious marker detection software in decision block 412. If so, the "YES" branch of decision block 412 is taken, the action to mitigate the malicious activity is taken by the malicious marker detection software in block 414, a log of the malicious activity is created and an alert is sent to the management system in block 416, and the method returns to block 408 where the software continues execution out of the management controller. If the detected malicious activity is not mitigable by the malicious marker detection software, the "NO" branch of decision block 412 is taken, a log of the malicious activity is created and an alert is sent to the management system in block 416, and the method returns to block 408 where the software continues execution out of the management controller.

Figure 5:
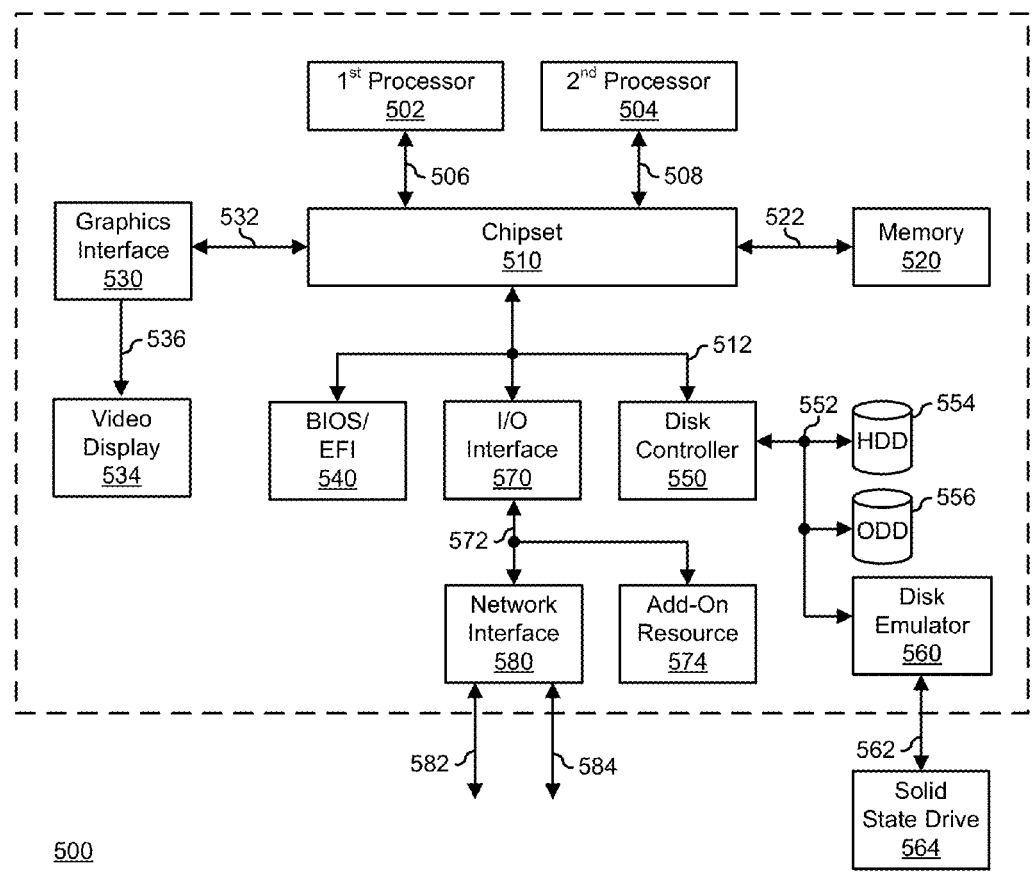
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be coupled to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor to provide a host processing environment; and
   a management controller separate from the processor and on a common board with the processor, the management controller operable to:
      store an anti-virus program and a malicious marker detection program in a memory of the management controller; and
      execute the malicious marker detection program to:
         detect a state of a device of the information handling system;
         determine that the host processing environment is under attack from a malicious program in response to detecting the state of the device; and
         send an alert to a management system coupled to the information handling system, the alert indicating that the host processing environment is under attack from the malicious program.

2. The information handling system of claim 1, wherein in detecting the state of the device the malicious marker detection program is further executed to:
   read a status register of the device.

3. The information handling system of claim 2, wherein in determining that the host processing environment is under attack the malicious marker detection program is further executed to:
   detect that the status register has been changed.

4. The information handling system of claim 1, wherein in detecting the state of the device the malicious marker detection program is further executed to:
   read a memory of the information handling system.

5. The information handling system of claim 1, wherein in detecting the state of the device the malicious marker detection program is further executed to:
   detect a network destination of network traffic on the information handling system.

6. The information handling system of claim 1, wherein in detecting the state of the device the malicious marker detection program is further executed to:
   detect a malicious packet in network traffic on the information handling system.

7. The information handling system of claim 1, wherein:
the device comprises a network storage device; and
in detecting the state of the device the malicious marker detection program is further executed to read data from the storage device.

8. The information handling system of claim 1, wherein the management controller is further operable to:
receive an update to the malicious marker detection program from the management system; and
store the update to the malicious marker detection program in the memory of the management controller.

9. The information handling system of claim 8, wherein, prior to receiving the update to the malicious marker detection program, the management controller is further operable to:
determine that the malicious marker detection program is out of date.

10. The information handling system of claim 1, wherein the malicious marker detection program is further executed to:
determine that the attack from the malicious program can be mitigated; and
mitigate the attack from the malicious program.

11. A method comprising:
storing an anti-virus program and a malicious marker detection program in a memory of a management controller on an information handling system; and
executing by the management controller the malicious marker detection program, wherein executing the malicious marker detection program comprises:
 detecting a state of a device of the information handling system;
 determining that a host processing environment instantiated on a processor of the information handling system is under attack from a malicious program in response to detecting the state of the device, wherein the management controller is on a common board with the processor; and
 sending an alert to a management system coupled to the information handling system, the alert indicating that the host processing environment is under attack from the malicious program.

12. The method of claim 11, wherein in detecting the state of the device the malicious marker detection program, executing the malicious marker detection program further comprises:
reading a status register of the device.

13. The method of claim 12, wherein in determining that the host processing environment is under attack, executing the malicious marker detection program further comprises:
detecting that the status register has been changed.

14. The method of claim 11, wherein in detecting the state of the device, executing the malicious marker detection program further comprises:
reading a memory of the information handling system.

15. The method of claim 11, wherein:
the device comprises a network storage device; and
in detecting the state of the device, executing the malicious marker detection program further comprises reading data from the storage device.

16. The method of claim 11, further comprising:
receiving by the management controller an update to the malicious marker detection program from the management system; and
storing the update to the malicious marker detection program in the memory of the management controller.

17. The method of claim 16, further comprising:
determine that the malicious marker detection program is out of date, prior to receiving the update to the malicious marker detection program.

18. A non-transitory computer-readable medium including code for carrying out a method, the method comprising:
storing an anti-virus program and a malicious marker detection program in a memory of a management controller; and
executing the malicious marker detection program, wherein executing the malicious marker detection program comprises:
 detecting a state of a device of an information handling system;
 determining that a host processing environment instantiated on a processor of the information handling system is under attack from a malicious program in response to detecting the state of the device, wherein the management controller is on a common board with the processor; and
sending an alert to a management system coupled to the information handling system, the alert indicating that the host processing environment is under attack from the malicious program.

19. The computer-readable medium of claim 18, wherein in detecting the state of the device the malicious marker detection program, executing the malicious marker detection program further comprises:
reading a status register of the device.

20. The computer-readable medium of claim 19, wherein in determining that the host processing environment is under attack, executing the malicious marker detection program further comprises:
detecting that the status register has been changed.

* * * * *